United States Patent
Campbell et al.

[11] Patent Number: 5,895,120
[45] Date of Patent: Apr. 20, 1999

[54] HIGH SPEED THRUST BEARING ASSEMBLY

[75] Inventors: David C. Campbell, Bel Air; Lynn E. Lentino, Westminster, both of Md.

[73] Assignee: Black & Decker, Inc., Newark, Del.

[21] Appl. No.: 08/868,707

[22] Filed: Jun. 4, 1997

[51] Int. Cl.$^6$ .................................................... F16C 17/04
[52] U.S. Cl. ........................................... 384/420; 384/425
[58] Field of Search ........................... 384/121, 226, 384/228, 240, 243, 244, 245, 246, 248, 249, 250, 251, 275, 368, 371, 420, 425; 310/90; 83/665, 666

[56] References Cited

U.S. PATENT DOCUMENTS

| | | | |
|---|---|---|---|
| 2,976,088 | 3/1961 | Contant | 308/158 |
| 3,066,714 | 12/1962 | Qualheim | 83/666 X |
| 3,300,260 | 1/1967 | Stern . | |
| 3,610,714 | 10/1971 | De Gacts | 308/193 |
| 3,705,752 | 12/1972 | Ott et al. | 384/245 |
| 3,950,834 | 4/1976 | Pitner | 384/425 X |
| 4,128,364 | 12/1978 | Papst et al. | 417/354 |
| 4,637,740 | 1/1987 | Olschewski et al. | 384/425 |
| 4,674,759 | 6/1987 | Parker | 384/420 X |
| 4,792,245 | 12/1988 | Fuke et al. | 384/610 |
| 4,934,238 | 6/1990 | Lauffer | 83/666 |
| 5,090,822 | 2/1992 | Scheffel | 384/193 |
| 5,169,245 | 12/1992 | Harada et al. | 384/610 |
| 5,212,999 | 5/1993 | Kitada | 384/245 X |
| 5,555,124 | 9/1996 | Yoshitsugu et al. | 359/200 |
| 5,568,976 | 10/1996 | Gabriele | 366/312 |

FOREIGN PATENT DOCUMENTS

| | | | |
|---|---|---|---|
| 1403824 | 10/1968 | Germany . | |
| 1422629 | 1/1969 | Germany . | |
| 238712 | 9/1989 | Japan | 384/368 |
| 170034 | 1/1960 | Switzerland | 384/244 |

*Primary Examiner*—Thomas R. Hannon

[57] ABSTRACT

A high speed thrust bearing assembly is provided for use on a hand-held circular saw. The thrust bearing assembly is held in place within a plastic housing which has a through hole therethrough. The plastic housing further has a first counterbore which is larger than the through hole, and a second counterbore which is larger than the first counterbore. A high speed thrust plate is placed within the plastic housing. The thrust plate has a flange section and a bearing section. The bearing section has an indentation therein. The thrust plate is placed within the plastic housing so that the bearing section is disposed through the through hole of the plastic housing with the flange section being held within the first counterbore. A sleeve bearing is thereafter placed within the second counterbore and surrounds a rotating shaft. The rotating shaft has a terminal end with a cylindrical projection thereon which matingly fits within the indentation of the bearing section in the thrust plate.

10 Claims, 1 Drawing Sheet

HIGH SPEED THRUST BEARING ASSEMBLY

BACKGROUND OF THE INVENTION

This invention relates to a high speed trust bearing assembly, and more particularly to a high speed thrust bearing assembly which can be used in a circular saw.

Circular saws are used in both a commercial and residential environment to cut a variety of items. The blade of a typical circular saw is driven by an electric motor. The motor has extending therefrom an armature shaft that typically rotates at speeds of up to 25,000 rpm. This armature shaft must be axially supported, while allowing it to properly rotate. In the past, this has been done utilizing one of the two bearing assemblies shown in FIGS. 3 and 4.

As shown in FIG. 3, it is known to insert the end of an armature shaft 10 through a cylindrical sleeve bearing 12. Shaft 10 will rotate within sleeve bearing 12 when the saw is in operation. Sleeve bearing 12 is held within a metal casting 14 in a press-fit relationship. Typical metals used for casting 14 include aluminum and zinc. Casting 14 is coupled to a plastic housing 16 with a suitable attaching means, such as screws 18. Shaft 10 has fixed thereon a commutator 20 that rotates shaft 10 through electromagnetic forces. Between commutator 20 and sleeve bearing 12 are one or more washers 22. In this prior art bearing arrangement, sleeve bearing 12 is axially supported within the metal casting 14. In particular, the contacting of commutator 20 with sleeve bearing 12 through washers 22 prevents axial movement of shaft 10 when the motor is in operation. However, the frictional contact between sleeve bearing 12 and commutator 20, acting through washer 22, occurs at a radially outward location relative to the axis of shaft 10. Therefore, the portion of commutator 20 in contact with sleeve bearing 12 will rotate at a high velocity, resulting in a large heat generation. Washers 22 and zinc casting 14 are employed in this bearing arrangement to dissipate this heat.

An alternative prior art bearing arrangement, as best seen in FIG. 4, eliminates the need for casting 14. In this embodiment, sleeve bearing 12 is held in place within plastic housing 16. Again, axial movement of shaft 10 is prevented by engagement of commutator 20 with sleeve bearing 12. The frictional contact between sleeve bearing 12 and commutator 20 still occurs at a radially outward location relative to the shaft center. Therefore, this embodiment also results in substantial heat generation. To dissipate the heat generated, one or more washers 22 can again be added. Because casting 14 has been eliminated from this arrangement, it is necessary to enlarge sleeve bearing 12 in an attempt to dissipate the heat generated. The use of a larger bearing increases the overall cost of the bearing arrangement, and therefore the overall cost of the product. Further, the generated heat, if not properly dissipated, can increase the wear rate experienced by sleeve bearing 12, thus inhibiting the overall performance of the saw. Neither of the above described prior art bearing arrangements provides a structure that can efficiently retain a high-temperature lubricant in the area of contact between the shaft, the commutator and the sleeve bearing. More specifically, lubricant placed in these areas is subject to a high degree of centrifugal force due to the radially outward location of these areas. Additionally, there is no defined structure to retain the lubricant. The use of a high temperature lubricant could further reduce the heat build-up and wear on the bearing assembly.

Therefore, a high speed thrust bearing assembly is needed that is simple in design, easily assembled and that results in lower heat generation so that metal castings and washers can be eliminated from the design. Further, a high speed thrust bearing assembly is needed that does not employ an oversized sleeve bearing. Still further, a high speed thrust bearing assembly is needed that provides a structure to allow a high temperature lubricant to be used to reduce heat and wear within the bearing assembly.

SUMMARY OF THE INVENTION

Accordingly, it is an object of the present invention to provide a high speed thrust bearing assembly that eliminates the need for a heat dissipating casting as well as heat dissipating washers.

It is another object of the present invention to provide a high speed thrust bearing assembly which provides axial support for a rotating shaft while eliminating contact between a commutator associated with the shaft and a sleeve bearing surrounding the shaft.

It is yet another object of the present invention to provide a thrust plate for use in a high speed thrust bearing assembly that provides axial support for a rotating shaft at a location of lower velocity resulting in a lower amount of heat generation.

It is still another object of the present invention to provide a high speed thrust plate for use in a high speed thrust bearing assembly that can be visually checked to ensure proper installation.

It is a further object of the present invention to provide a high speed thrust plate for use in a high speed thrust bearing assembly that can retain a high temperature lubricant.

According to the present invention, the foregoing and other objects are obtained by a high speed thrust bearing assembly for use on a hand-held circular saw. The thrust bearing assembly is held in place within a plastic housing. The plastic housing has a through hole therethrough, as well as a first counterbore which is larger than the through hole, and a second counterbore which is larger than the first counterbore. A high speed thrust plate is disposed within the plastic housing. The thrust plate has a flange section and a bearing section. The bearing section has an indentation therein. The thrust plate is placed within the plastic housing so that the bearing section is disposed through the through hole of the plastic housing with the flange section being held within the first counterbore. A sleeve bearing is thereafter placed within the second counterbore and surrounds a rotating shaft. The rotating shaft has a terminal end with a cylindrical projection thereon which matingly fits within the indentation of the bearing section in the thrust plate.

In this manner, the thrust plate contacts and provides axial support for the rotating shaft only at the projection, and the sleeve bearing does not contact the commutator. Therefore, heat due to axial thrust is generated due to the contact between the projection on the rotating shaft and the thrust plate. Because this contact occurs at a point radially inward of the outer diameter of the shaft, the rotational speed of the shaft is lower and a lesser amount of heat is therefore generated. Because the bearing section of the thrust plate extends partially through the plastic housing, the presence of the thrust plate can be checked visually. Because the bearing section of the thrust plate has an indentation therein, a high temperature lubricant may be used to reduce heat build up and wear on the thrust plate. The lubricant is maintained within the indentation due to its configuration.

BRIEF DESCRIPTION OF THE DRAWINGS

In the accompanying drawings which form a part of this specification and which are to be read in conjunction there-

Figure 1:
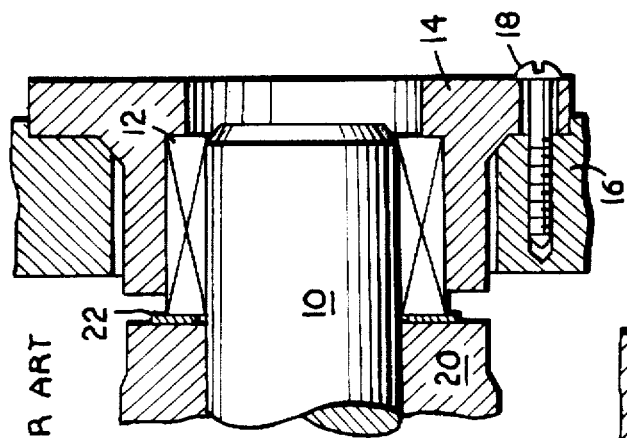
Figure 3:
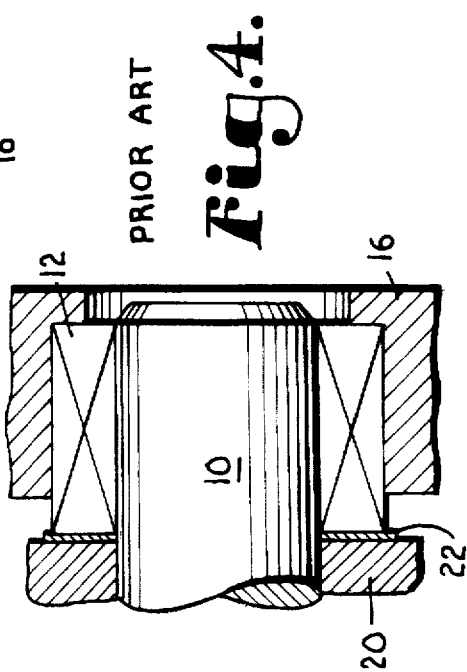
Figure 2:
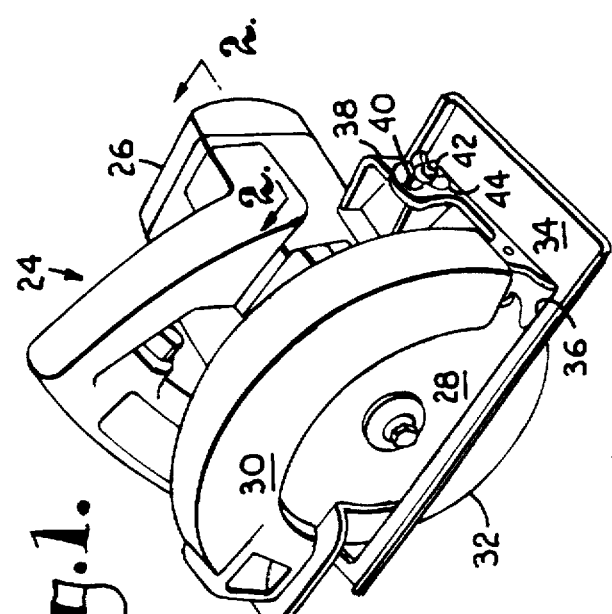
Figure 4:
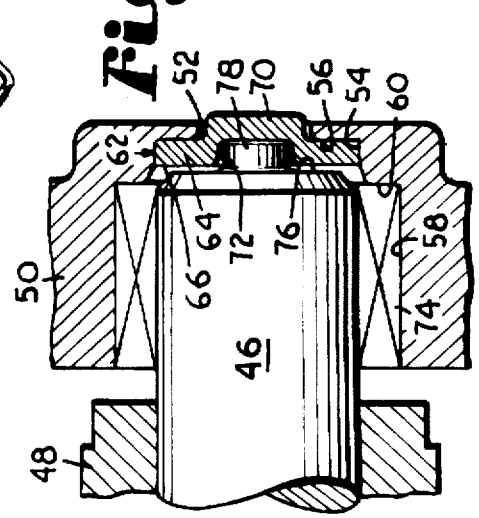

3 with and in which like reference numerals are used to indicate like parts in the various views:

FIG. 1 is a top perspective view of a circular saw;

FIG. 2 is an enlarged sectional view of the high speed thrust bearing assembly taken along line 2—2 of FIG. 1;

FIG. 3 is an enlarged sectional view similar to FIG. 2 showing a bearing assembly of the prior art; and FIG. 4 is an enlarged sectional view similar to FIG. 2 showing a bearing assembly used in the prior art.

DETAILED DESCRIPTION OF THE PREFERRED EMBODIMENTS

Referring to the drawings in greater detail, and initially to FIG. 1, a power circular saw designated generally by numeral 24 is shown. Saw 24 has a motor 26 which is operably attached to a circular saw blade 28. Power is supplied to motor 26 via an electrical power cord (not shown). Saw blade 28 is surrounded about its upper perimeter by an upper saw guard 30 which is fixedly secured to motor 26. The lower portion of saw blade 28 is surrounded by a lower saw guard 32. Saw 24 is further equipped with a planar saw shoe 34. Saw shoe 34 defines an opening 36 through which saw blade 28 can extend. Protruding upwardly from shoe 34 is an angle cut adjusting bracket 38 with a radiused slot 40 cut therethrough. Protruding through slot 40 is a fixed bolt 42 onto which is threaded a wing nut 44.

Lower saw guard 32 exposes the lower portion of blade 28 in a manner that is well known in the art. More specifically, the front edge of lower guard 32 engages the leading edge of a work piece. As the saw passes into the work piece, lower guard 32 is rotated generally upwardly to expose the lower portion of blade 28. Guard 32 is spring-loaded so that when saw 24 is disengaged from the work piece, lower guard 32 will return to its blade-covering position.

In operation, motor 26 of saw 24 is used to provide rotational power to blade 28. As best seen in FIG. 2, motor 26 has associated therewith an armature shaft 46. Attached to armature shaft 46 is a commutator 48, as is well known in the art. Armature shaft 46 rotates at speeds up to 25,000 rpm, and thus can generate a significant amount of heat. As discussed above, various prior art bearing assemblies have been used in an attempt to dissipate this heat. These assemblies involve the use of over-sized sleeve bearings, washers, and metal castings.

The high speed thrust bearing assembly of the present invention is held in place within a plastic housing 50. Plastic housing 50 has a hole 52 extending therethrough that is centered with respect to armature shaft 46. Extending partially into plastic housing 50 and centered on through hole 52, is a first counterbore 54 that has a diameter which is larger than the diameter of through hole 52. First counterbore 54 thus defines a first shoulder 56. Also extending into plastic housing 50 and centered on through hole 52 is a second counterbore 58 that has a diameter larger than first counterbore 54. Second counterbore 58 thus defines a second shoulder 60.

Disposed in first counterbore 54 is a generally circular high speed thrust plate 62. Thrust plate 62 is made from a polymeric material with a high heat resistance, a low coefficient of friction, a low wear rate at high speeds and a low thermal conductivity. Materials that meet these criteria include, but are in no way limited to, "VESPEL," manufactured by DuPont, "TORLON," manufactured by Amoco, and "LUBRICOMP O-BG," manufactured by LNP Engineering Plastics, Inc. of Exton, Pa. Thrust plate 62 has a flange section 64 with a first surface 66 facing towards shaft 46 and a second surface 68 facing away from shaft 46. Second surface 68 of flange section 64 is supported by first shoulder 56. Thrust plate 62 further has a bearing section 70 which extends partially through hole 52. Bearing section 70 defines a cylindrical indentation 72 which extends from first surface 66 towards second surface 68 of flange section 64.

Disposed within second counterbore 58 is a cylindrical sleeve bearing 74 which surrounds shaft 46 as is well known in the art. Sleeve bearing 74 is pressed fitted into housing 50 until it abuts second shoulder 60. As shown in FIG. 2, sleeve bearing 74 does not contact commutator 48. Further, the inside diameter of sleeve bearing 74 is less than the outside diameter of thrust plate 62.

As shown in FIG. 2, shaft 46 has a terminal end 76 which has a cylindrical projection 78 thereon. Shaft 46 can easily be machined with projection 78 thereon during the automated machining of the shaft. Projection 78 is sized to matingly fit within indentation 72 of thrust plate 62 as is more fully discussed below.

To assemble the high speed thrust bearing assembly of the present invention, sleeve bearing 74 is first placed over the end of a press fixture (not shown) followed by thrust plate 62 which is held on the press fixture by a small projecting pin (not shown). Thrust plate 62 and bearing 74 are then pressed into plastic housing 50. Since the outside diameter of thrust plate 62 is larger than the inside diameter of sleeve bearing 74, thrust plate 62 is captured between the end of sleeve bearing 74 and first shoulder 56. In this assembly process, indentation 72 ensures that thrust plate 62 is centered with respect to the bearing during pressing. Furthermore, after assembly, bearing section 70 will protrude through hole 52, allowing easy visual inspection of the outside of the thrust plate. This visibility is important on the assembly line, since the motor assembly could accidentally be assembled without thrust plate 62, resulting in motor failure.

Prior to installation of shaft 46, a high temperature lubricant may be placed in indentation 72 or on the end of shaft projection 78. This high temperature lubricant can reduce wear on thrust plate 62. Indentation 72 helps to trap and retain the lubricant within thrust plate 62.

After thrust plate 62 and sleeve bearing 74 have been installed, shaft 46 is placed within the bearing assembly. The outside diameter of shaft 46 contacts sleeve bearing 74 while projection 78 contacts bearing section 70 at indentation 72 to prevent axial movement. Thrust plate 62 therefore contacts and provides axial support to shaft 46 only at projection 78 and indentation 72. That is, the remaining portion of end 76 other than projection 78 does not contact plate 62. Further, sleeve bearing 74 does not contact commutator 48. Thus, heat due to axial thrust is generated solely by the contact between projection 78 and thrust plate 62. Because this contact occurs at a radially inward location where the rotational speed of the shaft is lower, a lesser amount of heat is generated as compared to the prior art. Further, because thrust plate 62 is made from a polymeric material with a low coefficient of friction, the amount of heat generated will be further reduced. Still further, the transfer of the heat that is generated is impeded by the high heat resistance and low thermal conductivity of plate 62 such that the heat will not spread and result in heat damage to plastic housing 50. Therefore, the design of the present invention eliminates the need for a larger sleeve bearing, washers, and metal castings that were previously used to dissipate generated heat and prevent melting of a plastic housing.

From the foregoing it will be seen that this invention is one well-adapted to obtain all the objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A high speed thrust bearing assembly for supporting a rotating shaft comprising:
   a thrust plate having a flange section and a bearing section, said flange section having a first surface facing towards the shaft and a second surface facing away from the shaft, said bearing section having a cylindrical indentation extending into said plate from said first surface towards said second surface, said thrust plate being made from a polymeric material with a high heat resistance and a low coefficient of friction, a low wear rate at high speeds, and a low thermal conductivity; and
   a plastic housing having a through hole through which said bearing section protrudes, a first counterbore for supporting said flange section and a second counterbore for accommodating said shaft;
   wherein the rotating shaft has a terminal end facing said first surface, said terminal end having a cylindrical projection extending therefrom which matingly fits within said indentation;
   whereby said thrust plate contacts and provides axial support for said shaft at said projection, reducing heat generation due to axial thrust.

2. The thrust bearing assembly of claim 1, further comprising a cylindrical sleeve bearing having an inner diameter and an outer diameter, said sleeve bearing being located within said second counterbore, said sleeve bearing contacting the outer diameter of the shaft.

3. The thrust bearing assembly of claim 2, wherein said flange section is ring-shaped and has an outer diameter that is greater than the inner diameter of said sleeve bearing so that said thrust plate is retained within said housing by said sleeve bearing.

4. A high speed thrust bearing assembly for supporting the axial thrust of a rotating shaft, the assembly comprising:
   a plastic housing having a through hole, a first counterbore having a diameter larger than said through hole and a second counterbore having a diameter larger than the diameter of said first counterbore;
   a thrust plate having a flange section with an outer diameter and a bearing section, said flange section being held within said first counterbore and having a first surface facing towards the shaft and a second surface facing away from the shaft, said bearing section having an indentation extending into said plate from said first surface towards said second surface, said bearing section extending into said through hole; and
   a cylindrical sleeve bearing having an inner diameter and an outer diameter, said sleeve bearing being located within said second counterbore, said inner diameter of said sleeve bearing contacting the outer diameter of the shaft;
   wherein said outer diameter of said thrust plate is greater than the inner diameter of said cylindrical sleeve bearing so that said thrust plate is retained within said housing by said sleeve bearing;
   wherein the rotating shaft has a terminal end facing said first surface, said terminal end having a projection extending therefrom which matingly fits within said indentation;
   whereby said thrust plate contacts and provides axial support for said shaft at said projection, reducing heat generation due to axial thrust.

5. The thrust bearing assembly of claim 4, wherein said indentation and said projection are cylindrical in shape.

6. The thrust bearing assembly of claim 5, wherein said thrust plate is made from a polymeric material with a high heat resistance, a low coefficient of friction, a low wear rate at high speeds and a low thermal conductivity.

7. A high speed trust bearing assembly for supporting a motor shaft having a commutator thereon comprising:
   a thrust plate having a flange section and a bearing section, said flange section having a first surface facing towards the shaft and a second surface facing away from the shaft, said bearing section having a cylindrical indentation extending into said plate from said first surface towards said second surface; and
   a plastic housing having a through hole, through which said bearing section protrudes, a first counterbore for supporting said flange section and a second counterbore for accommodating said shaft;
   wherein the rotating shaft has a terminal end facing said first surface, said terminal end having a cylindrical projection extending therefrom which matingly fits within said indentation;
   whereby said thrust plate contacts and provides axial support for said shaft at said projection, reducing heat generation due to axial thrust.

8. The thrust bearing assembly of claim 7, further comprising a cylindrical sleeve bearing having an inner diameter and an outer diameter, said sleeve bearing being located within said second counterbore, said sleeve bearing contacting the outer diameter of the shaft and sized so as not to contact the commutator on the shaft.

9. The thrust bearing assembly of claim 8, wherein said flange section is ring-shaped and has an outer diameter that is greater than the inner diameter of said sleeve bearing so that said thrust plate is retained within said housing by said sleeve bearing.

10. A power tool comprising:
   a housing;
   a motor disposed in said housing and powering a rotating shaft;
   a cutting member powered by said motor; and
   a thrust plate having a flange section and a bearing section, said flange section having a first surface facing towards the shaft and a second surface facing away from the shaft, said housing supporting said flange section, and said bearing section having an indentation extending into said plate from said first surface towards said second surface;
   wherein said rotating shaft has a terminal end facing said first surface, said terminal end having a projection extending therefrom which matingly fits within said indentation;
   whereby said thrust plate contacts and provides axial support for said shaft at said projection, reducing heat generation due to axial thrust.

* * * * *